The specification in this pa
is not to print.
6480X
PATENTED APR. 15, 1831.
S. ANDREWS.
GAS GENERATOR.
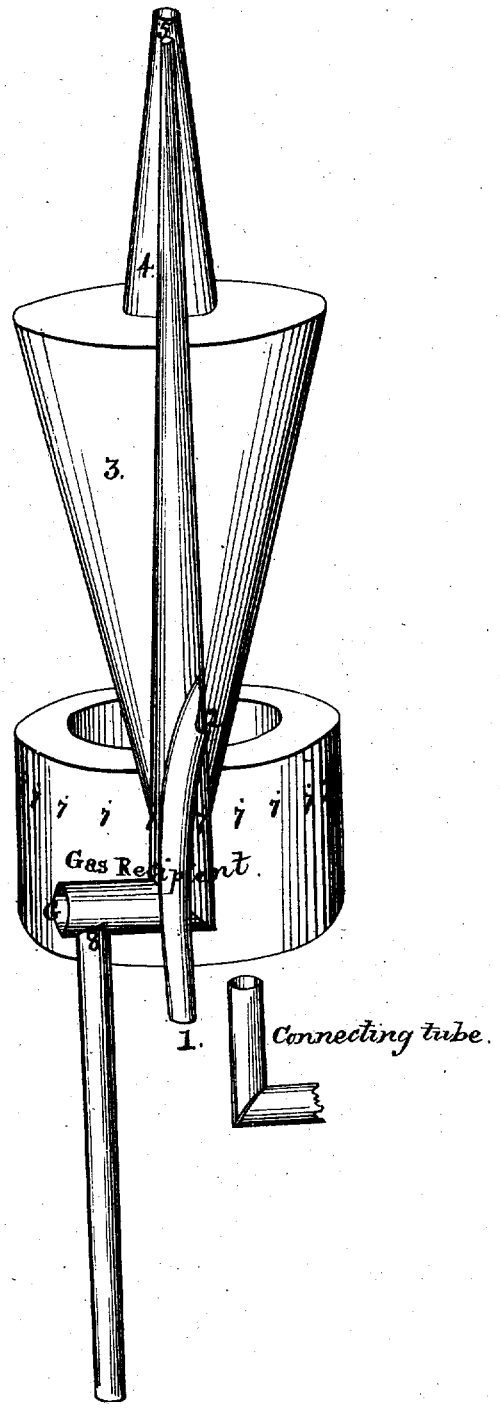

[illegible] [illegible]

Apl. 15. 1831

Solomon Andrews of Perth Amboy, N. Jersey.

Letters Patent

The schedule referred to in the Letters Patent, and making part of the same, containing a description in the words of the said Solomon Andrews himself, — of his improvement, being a method of generating gas and of supplying and continuing gas light, out of oil or other suitable substance, by means of the gas light itself in lamps or machines, either fixed or moveable —

---

To all persons to whom these presents shall come, Solomon Andrews of the City of Perth Amboy, in the County of Middlesex, and State of New Jersey, sends greeting: Be it known that I, Solomon Andrews, have invented, constructed, made and applied to use, a new and useful method of generating gas and of supplying and continuing gas light, out of oil or other suitable substance by means of the gas light itself, in lamps or machines either fixed or moveable, specified in the words following towit. My new invented method of generating gas and of supplying and containing gas light, out of oil or other suitable substance by means of the gas light itself in lamps or machines either fixed or moveable, consists in having the gas lamp or machine so constructed as that the heat of the inflamed gas or gas light itself, operating upon the oil or other substance used for the purpose shall continue to form gas therefrom to supply and feed the gas light. The gas lamp or machine used for the purpose may be described with sufficient accuracy by means of and by reference to the plate hereto annexed — Figure 1. represents the orifice through which enters the oil or other material of which the gas is made —
Figure 2. The supply tube emptying into the bulb — Fig. 3. The bulb represented in the plate in the form of an inverted cone and which may be filled with a fine wire to divide the fluid into small particles, and the more readily to conduct the caloric into it; or it may be filled with any other substance or substances so finely divided and arranged, as to be thereby rendered porous and fitted to produce the same effect. In this bulb principally the gas is generated — Fig. 4. A turret erected to cover the gas tube, which may conveniently be elongated or extended higher up than the bulb the better to

7/15/1851 6980X prevent any particles of matter from the oil or other substance from entering the gas tube, and with a view to exclude therefrom every thing but the gas itself – Fig 5. the entrance into the gas tube, which extends down through the bulb and empties into the gas recipient below – –

Fig. 6. the emptying of the gas tube into the recipient, which recipient is delineated and named in the plate – Figures 7. the holes or orifices through which the gas issues from the recipient, when it is to be inflamed – – –

Fig. 8. The entrance of the surplus tube below. The oil or other substance, used for the generation of gas, in this machine entering at the orifice of the supply tube passes up the tube into the bulb. and there is converted into gas by means of the caloric. The gas rises to the top of the bulb, and thence up the turret, and having no other escape, enters the gas tube, and thence passing down the gas tube, it enters the recipient, whence it passes through the small holes or orifices and is inflamed. – The surplus tube serves to conduct off any particles of fluid or extraneous matter which may come down with the gas through the gas tube, and which if not thus conducted off, might obstruct the holes or orifices through which the gas issues – The surplus tube may be dispensed with, and also the turret, when the gas tube is not elongated; but they will – be found convenient for the reasons above stated –

In order to commence the operation, after the oil or other substance used is mixed into the bulb, it will be necessary to apply heat to the bulb, which may be done by the application of a common lighted candle or lamp, and the operation will be facilitated by the use of a small blow pipe – . The heat thus applied generates a small portion of gas, which issuing through the orifices in the manner above detailed, is inflamed by the applied heat. The inflamed gas or gas light rises and approaching towards the bulb applies heat to it which continues to generate gas in the bulb, and to supply the gas light – More gas may be generated by the use of this machine than is sufficient for the continuation of the process – – –

The supply tube of the gas lamp or machine should be fitted and attached to the extremity or upper orifice of a conducting tube, proceeding from a reservoir or fountain, containing the oil or other material used for the generation of gas, for the purpose of conveying the oil or other material as aforesaid, to the orifice of the supply tube - For the more perfect operation of this machine, it will be necessary to preserve the oil or substance used for the generation of gas at a proper and regular height in the bulb, lest on the one hand, it rises so high as to enter the gas tube, or on the other, there be not sufficient in the bulb to afford a full supply of gas - -

This end may be attained in many different ways, for instance by means of the common fountain lamp, or by permitting the oil or other substance from a common reservoir to pass through an orifice sufficiently large to admit the proper quantity into the bulb, as for instance, through a stop-cock - These machines may be made of any metallic substance not fusible by the degree of heat caused and required in the operation, but I believe silver to be the best, it being the best conductor of caloric, and being esteemed less liable to oxydation by the heat, than any imperfect metal - - Platina and gold will undoubtedly answer a very good purpose. Copper has been chiefly used by me in making my experiments, and the machines made of it have been found to fill up with the oxyd and carbonaceous matter, in about two months - one in which the bulb was made of silver, and containing silver wire, and the residue of the machine was of copper, has continued in use about six months - The machines may be made in such manner as that they can be opened at any time, in order to clean out the carbonaceous matter or other foreign substance, that may get into them, or be formed there - Should any substance besides oil, be used, in making the gas, such as turpentine, spirit of turpentine, pitch, alcohol, &c. or any combination of them, or others, which require a less degree of heat than 600 degrees of Farenheit, almost any metallic substance may be used in the formation of these lamps or machines, and probably some substances not metallic, as for instance, glass - - -

It may be of importance to remark that I have fixed one of these machines upon a stick of tallow, similar to a common candle without a wick, which by the heat melted the tallow, and the melted tallow rising up through the supply tube, was converted into gas, as fast as was necessary to continue the gas light. My new invention consists, in generating and forming out of the oil or other substance used for the purpose, the gas, which continues and supplies the flame of the gas light, by the application of the heat of the inflamed gas itself, to the oil or other substance used, so as to cause a continued gas light, and without the intervention or use of wick to burn in contact with the flame; and in so constructing and forming the gas lamp or machine as to produce that effect— —

The gas lamp or machine to produce this effect may be varied, to wit: the gas may come out of the holes or orifices, perpendicularly, or horizontally; one orifice only may be used; the formation of the bulb may be varied, sever-al gas tubes may be used, instead of one; and it may be otherwise varied in form and proportion in a great variety of ways to suit the taste and views of the manufacturer, so long as the principle of the invention is preserved.

In testimony that the above is a true specification of my said invention as above described, I have hereto set my hand and seal this thirtieth day of March in the year of our Lord, one thousand eight hundred and thirty-one—

Witnesses
John D. Lee
John R. Watson

Solomon Andrews

[1754 [illegible]]

Exd.
[illegible]